(12) United States Patent
Kim (10) Patent No.: US 7,479,951 B2
(45) Date of Patent: Jan. 20, 2009

(54) DEVICE FOR CONTROLLING TOUCH PANEL

(75) Inventor: Chang Hwan Kim, Ansan-si (KR)

(73) Assignee: Digitech Systems Co., Ltd (KR)

( * ) Notice: Subject to any disclaimer, the term of this patent is extended or adjusted under 35 U.S.C. 154(b) by 722 days.

(21) Appl. No.: 11/067,831

(22) Filed: Feb. 17, 2005

(65) Prior Publication Data

US 2006/0017704 A1 Jan. 26, 2006

(30) Foreign Application Priority Data

Jul. 22, 2004 (KR) .............................. 2004/57116

(51) Int. Cl.
- G09G 5/00 (2006.01)
- G06F 3/041 (2006.01)
- G06F 3/045 (2006.01)

(52) U.S. Cl. ................. 345/179; 178/18.01; 178/18.02; 178/18.03; 178/18.05; 178/19.01; 327/517; 345/156; 345/173; 345/174; 379/93.19

(58) Field of Classification Search ... 178/18.01–18.03, 178/18.05, 19.01, 19.06–20.04; 327/517; 345/156, 173, 174, 179; 379/93.19
See application file for complete search history.

(56) References Cited

U.S. PATENT DOCUMENTS

| | | | | |
|---|---|---|---|---|
| 4,623,757 A | * | 11/1986 | Marino | ..................... 178/18.03 |
| 5,008,497 A | * | 4/1991 | Asher | ....................... 178/18.05 |
| 6,058,485 A | * | 5/2000 | Koziuk et al. | ................ 713/320 |
| 6,661,406 B1 | * | 12/2003 | Enoki | .......................... 345/173 |
| 6,816,153 B2 | * | 11/2004 | Yamada et al. | ............... 345/174 |
| 6,975,307 B2 | | 12/2005 | Chang et al. | |
| 7,236,160 B2 | * | 6/2007 | Kong | .......................... 345/173 |
| 7,236,161 B2 | * | 6/2007 | Geaghan et al. | ............. 345/173 |
| 7,250,940 B2 | * | 7/2007 | Jayanetti et al. | ............. 345/173 |

* cited by examiner

*Primary Examiner*—Sumati Lefkowitz
*Assistant Examiner*—Alexander S Beck
(74) *Attorney, Agent, or Firm*—The Farrell Law Firm (57) ABSTRACT

Disclosed herein is a device including a differential amplification unit for supplying current to the touch panel; a signal amplification unit for amplifying the output voltage of the differential amplification unit; an analog-digital conversion unit for converting the analog output signal of the signal amplification unit into a digital signal; a control unit for measuring the signal output from the analog-digital conversion unit and detecting the position of an object when the object touches the touch panel; and a sine wave generating unit for providing a sine wave signal to the differential amplification unit in response to the output signal of the control unit, supplying a maximum current to the differential amplification unit while the touch panel is in a standby state, and controlling the level of the sine wave signal in response to conductivity of the object when the object touches the touch panel.

5 Claims, 6 Drawing Sheets

DEVICE FOR CONTROLLING TOUCH PANEL

This application claims priority to an application entitled "Device for Controlling Touch Panel" filed in the Korean Intellectual Property Office on Jul. 22, 2004 and assigned Serial No. 2004-57116, the contents of which are incorporated herein by reference.

BACKGROUND OF THE INVENTION

1. Field of the Invention

The present invention relates to a device for controlling a touch panel, and more particularly, to a device for controlling a touch panel, which maintains the quantity of current output from a differential amplification unit at an appropriate level in order to prevent plus and minus power supply voltages from clamping due to saturation of the output signal of the differential amplification unit when an excessively large quantity of current is output from the differential amplification unit, to thereby generate no distortion in the output signal of the differential amplification unit and detect a correct touched point irrespective of the level of conductivity of an object touching a touch panel.

2. Background of the Related Art

With the development of computers using digital technologies, peripheral devices also have been developed. The computer peripheral devices include a monitor, a keyboard, a mouse, a microphone, speakers and so on. Particularly, the keyboard and microphone are used to input external data to a computer. Specifically, the keyboard inputs data to the computer in a manner that its keys are pushed and the microphone inputs data using its user's voice. However, the more effective and easier method for inputting data to the computer is that a user touches the screen of the monitor connected to the computer to input data to the computer. For example, it is easier for the user to produce graphics on paper using a pen than the keyboard or mouse. Thus, it is inconvenient for the user to produce graphics using the computer.

However, when the user directly processes graphics on a touch panel using a touch pen, he/she can process the graphic work very easy and delicately. Accordingly, portable devices including the touch panel are replacing the peripheral devices such as the keyboard and mouse. For example, PDA (Personal Digital Assistant) includes a touch panel and a touch pen instead of a keyboard having keys by which users manually input data such that the user operate the touch panel using the touch pen to input data or commands.

When people touch the touch panel in a prior art, however, a constant quantity of current is applied to the touch panel all the time. Accordingly, an excessively large quantity of current flows when a person with high conductivity touches the touch panel and a correct touched point cannot be detected when a person with low conductivity touches the touch panel.

SUMMARY OF THE INVENTION

Accordingly, the present invention has been made in view of the above problems occurring in the prior art, and it is an object of the present invention is to provide a device for controlling a touch panel, which maintains the quantity of current output from a differential amplification unit at an appropriate level in order to prevent plus and minus power supply voltages from clamping due to saturation of the output signal of the differential amplification unit when an excessively large quantity of current is output from the differential amplification unit, to thereby generate no distortion in the output signal of the differential amplification unit and detect a correct touched point irrespective of the level of conductivity of an object touching a touch panel.

To accomplish the above object, according to the present invention, there is provided a device for controlling a touch panel including: a differential amplification unit for supplying current to the touch panel; a signal amplification unit for amplifying the output voltage of the differential amplification unit; an analog-digital conversion unit for converting the analog output signal of the signal amplification unit into a digital signal; a control unit for measuring the signal output from the analog-digital conversion unit and detecting the position of an object when the object touches the touch panel; and a sine wave generating unit for providing a sine wave signal to the differential amplification unit in response to the output signal of the control unit, supplying a maximum current to the differential amplification unit while the touch panel is in a standby state, and controlling the level of the sine wave signal in response to conductivity of the object when the object touches the touch panel.

In an aspect of the present invention, the sine wave generating unit includes: a square wave controller for receiving a square wave signal from the control unit and controlling the level of the square wave signal; a triangle wave converter for converting the square wave signal output from the square wave controller into a triangle wave signal; and a sine wave generator for converting the triangle wave signal output from the triangle wave converter into a sine wave signal and supplying the sine wave signal to the differential amplification unit.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
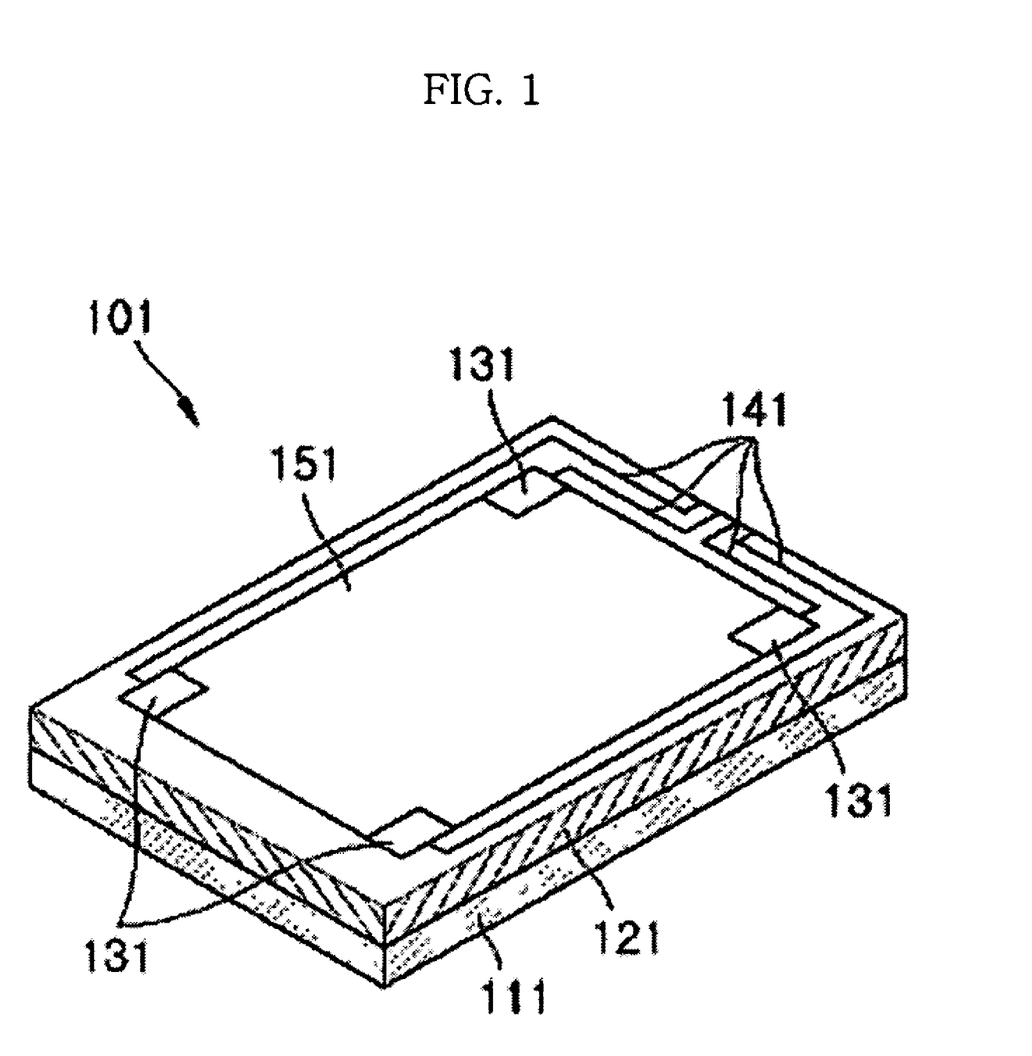
FIG. 1 illustrates the structure of a touch panel to which the present invention is applied.

FIG. 1 illustrates the structure of a touch panel 101 to which the present invention is applied. Referring to FIG. 1, the touch panel 101 includes a glass substrate 111, a transparent conductive film 121 attached onto the glass substrate 111, electrodes 131 respectively formed at the corners of the conductive film 121, and wires 141 connected to the electrodes 131 and formed on the marginal portion of the conductive film 121. One end of each wire 141 is connected to a differential amplification unit (211 of FIG. 2).

When the electrodes 131 are provided with current through the wires 141, current output from the electrodes 131 flows all over the conductive film 121.

Figure 2:
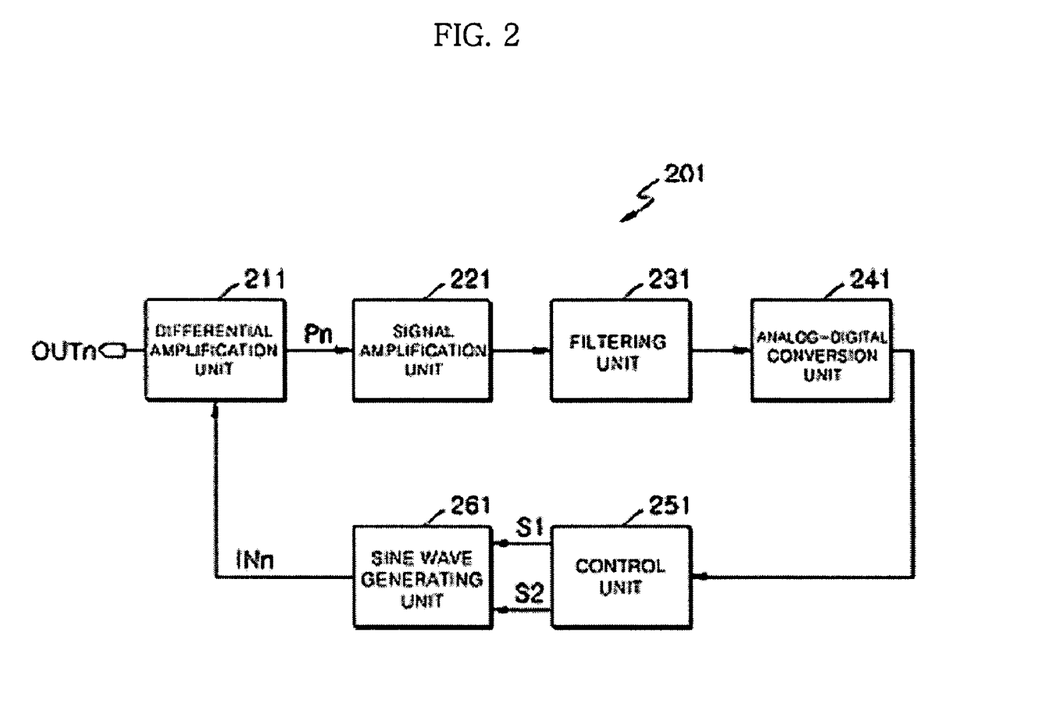
FIG. 2 is a block diagram of a device for controlling a touch panel according to an embodiment of the present invention.

FIG. 2 is a block diagram of a device 201 for controlling a touch panel according to an embodiment of the present invention. Referring to FIG. 2, the touch panel controlling device 201 includes the differential amplification unit 211, a signal amplification unit 221, a filtering unit 231, an analog-digital conversion unit 241, a control unit 251 and a sine wave generating unit 261.

The differential amplification unit 211 is connected to the electrodes (131 of FIG. 1), receives a sine wave signal INn from the sine wave generating unit 261 and provides current OUTn to the electrodes (131 of FIG. 1). When a specific object, for example, the hand of a user, touches the screen (151 of FIG. 1) of the touch panel, the current OUTn output from the differential amplification unit 211 flows into the body of the user through the screen (151 of FIG. 1) of the touch panel. Here, the quantity of current flowing from the differential amplification unit 211 to the touch panel (101 of FIG. 1) depends on conductivity of the user. That is, the quantity of current output from the differential amplification unit 211 is increased in the case of a user with high conductivity (a person through which current flows well) but decreased in the case of a user with low conductivity (a person through which current does not flow well).

The output voltage Pn of the differential amplification unit 211 depends on the quantity of current output from the differential amplification unit 211. That is, the output voltage Pn of the differential amplification unit 211 is increased when the quantity of current OUTn output from the differential amplification unit 211 is increased but decreased when the quantity of current OUTn is reduced. The differential amplification unit 211 includes a plurality of differential amplifiers 301, 302, 303 and 304 (referring to FIG. 3), which are connected to the electrodes (131 of FIG) one to one.

The signal amplification unit 221 amplifies the output voltage Pn of the differential amplification unit 211 to a predetermined level. The signal amplification unit 221 includes a plurality of signal amplifiers (not shown), which are connected to the plurality of differential amplifiers (301, 302, 303 and 304 of FIG. 3) one to one and amplify voltages output from the corresponding differential amplifiers.

The filtering unit 231 is connected to the signal amplification unit 221 and removes a noise included in the output signal of the signal amplification unit 221. The filtering unit 231 includes a plurality of filters (not shown), which are connected to the plurality of signal amplifiers one to one and remove noises included in the signals output from the corresponding signal amplifiers.

The analog-digital conversion unit 241 converts an analog signal output from the filtering unit 231 into a digital signal. The analog-digital conversion unit 241 includes a plurality of analog-digital converters (not shown), which are connected to the plurality of filters of the filtering unit 231 one to one and convert analog signals output from the corresponding filters into digital signals.

The control unit 251 receives the output signal of the analog-digital conversion unit 241 and analyzes it to detect the position of the user's hand touching the screen (151 of FIG. 1) of the touch panel. Specifically, the control unit 251 receives the digital signals output from the plurality of analog-digital converters of the analog-digital conversion unit 241 and compares the levels of the received digital signals to detect the position of the user's hand touching the screen of the touch panel. The control unit 251 calculates the rate of the quantity of current flowing from the differential amplification unit 211 to the user's hand to detect the position of the user's hand touching the screen of the touch panel. An object touching the touch panel (101 of FIG. 1) includes a touch pen. The control unit 251 can be composed of a micro-controller or a CPU (Central Processing Unit).

The sine wave generating unit 261 supplies the sine wave signal INn to the differential amplification unit 211 in response to a control signal S1 output from the control unit 251. The sine wave generating unit 261 will be explained later in detail with reference to FIG. 4.

Figure 3:
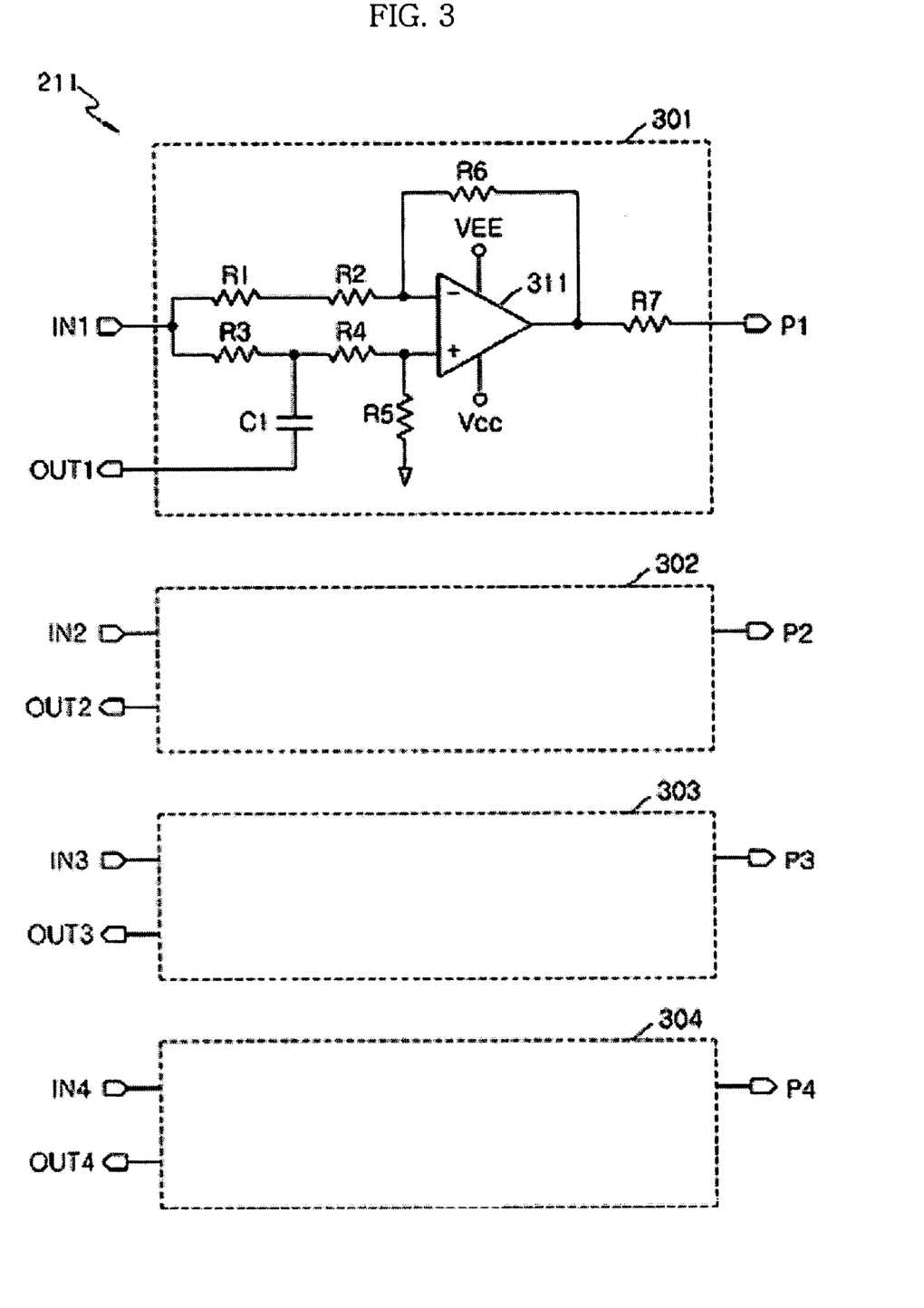
FIG. 3 is a circuit diagram of the differential amplification unit of FIG. 2.

FIG. 3 is a circuit diagram of the differential amplification unit 211 of FIG. 2. Referring to FIG. 3, the differential amplification unit 211 includes the plurality of differential amplifiers 301, 302, 303 and 304. The differential amplifiers 301, 302, 303 and 304 have the same configuration and operation so that only the configuration and operation of the differential amplifier 301 are explained.

The differential amplifier 301 includes a plurality of resistors R1 to R7, a capacitor C1 and an operational amplifier 311. The differential amplifier 301 receives the sine wave signal INn from the sine wave generating unit 261 and provides current to the touch panel (101 of FIG. 1). The differential amplifier 301 supplies a maximum current to the electrodes (131 of FIG. 1) of the touch panel while the screen (151 of FIG. 1) of the touch panel waits for an object to touch. Here, the output voltage P1 of the operational amplifier 311 is zero because the same voltage is applied to the positive and negative input ports of the operational amplifier 311. However, when an object, for example, the user's hand, touches the screen (151 of FIG. 1) of the touch panel, the maximum current is output from the differential amplifier 301. Then, a voltage different is generated between the positive and negative input ports of the operational amplifier 311. The operational amplifier 311 amplifies the voltage difference to generate the output voltage P1.

The output voltage P1 of the differential amplifier 301 depends on the quantity of current OUT1 output from the differential amplifier 301. That is, the voltage difference between the positive and negative input ports of the operational amplifier 311 is increased when the quantity of current OUT1 output from the differential amplifier 301 is increased to result in an increase in the output voltage P1 of the differential amplifier 301. On the contrary, the voltage difference between the positive and negative input ports of the operational amplifier 311 is decreased when the quantity of current OUT1 output from the differential amplifier 301 is reduced to result in a decrease in the output voltage P1 of the differential amplifier 301.

Here, when an excessively small quantity of current is output from the differential amplifier 301, the amplitude of the output signal P1 of the differential amplifier 301 becomes too small and thus it is difficult to detect the position of the object touching the touch panel (101 of FIG. 1). On the contrary, when an excessively large quantity of current is output from the differential amplifier 301, the output signal P1 of the differential amplifier 301 is saturated to clamp plus power supply voltage VCC and minus power supply voltage VEE. Accordingly, the quantity of current output from the differential amplifier 301 should be maintained at an appropriate level in order to prevent the output signal P1 of the differential amplifier 301 from being distorted and to detect the correct position of the object touching the touch panel.

Figure 4:
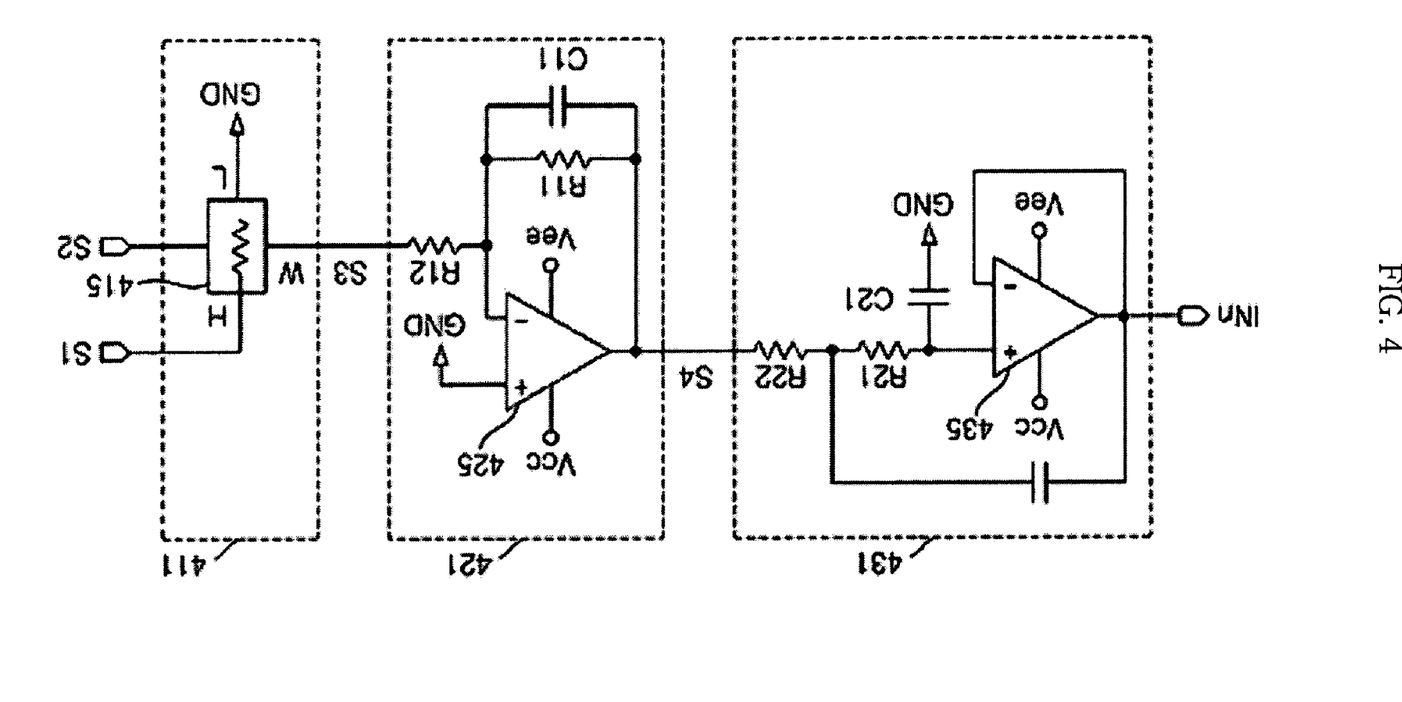
FIG. 4 is a circuit diagram of the sine wave generating unit of FIG. 2.

FIG. 4 is a circuit diagram of the sine wave generating unit 261 of FIG. 2. The sine wave generating unit includes a square wave controller 411, a triangle wave converter 421 and a sine wave generator 431.

The square wave controller 411 receives a square wave signal S1 and a control signal S2 from the control unit (251 of FIG. 2) and controls the level of the square wave signal S1. The square wave controller 411 includes a potentiometer 415. The H-terminal of the potentiometer 415 is provided with the square wave signal S1 having a predetermined level, for example, 5V, its L-terminal is grounded, and its W-terminal is connected to the triangle wave converter 421. In this state, when the control signal S2 is supplied from the control unit (251 of FIG. 2) to the potentiometer 415, the position of the W-terminal is adjusted in response to the state of the control signal S2. That is, the internal resistance of the potentiometer 415 is adjusted. Accordingly, the level of a square wave signal S3 output from the W-terminal is controlled.

That is, the control unit (251 of FIG. 1) generates the control signal S2 to reduce the level of the square wave signal S3 output from the square wave controller 411 when a large quantity of current OUTn is output from the differential amplification unit (211 of FIG. 2) but increases the level of the square wave signal S3 when a small quantity of current OUTn is output from the differential amplification unit to control the differential amplification unit (211 of FIG. 2) to output an appropriate quantity of current. Accordingly, unnecessary current is not output from the differential amplification unit (211 of FIG. 2) and the correct position of the object touching the screen (151 of FIG. 1) of the touch panel is detected.

Figure 5:
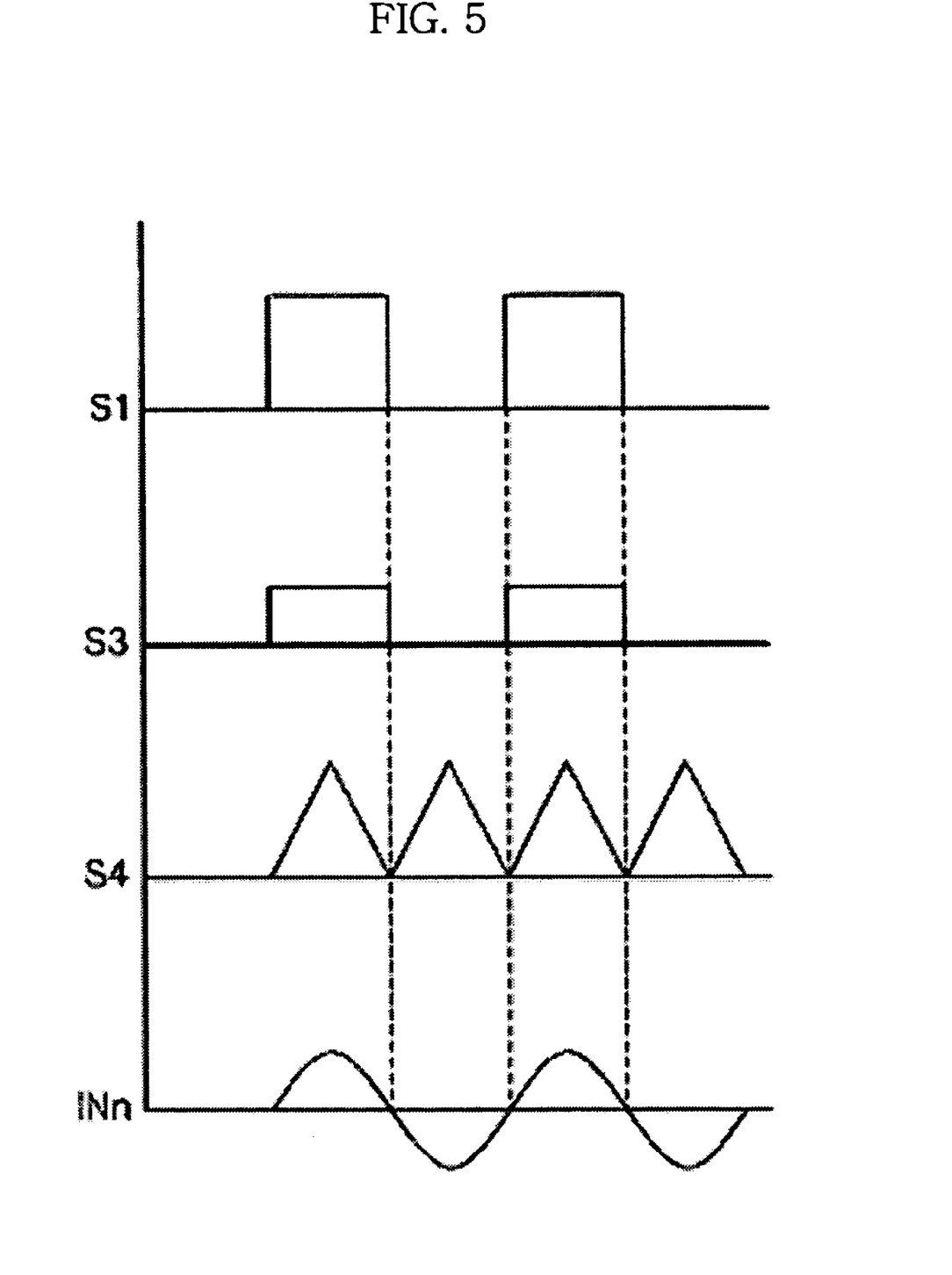
FIG. 5 is a waveform diagram of signals used in the sine wave generating unit of FIG. 4.

The triangle wave converter 421 receives the square wave signal S3 output from the square wave controller 411 and converts it into a triangle wave signal S4, as shown in FIG. 5. The triangle wave converter 421 includes an operational amplifier 425, resistors R11 and R12 and a capacitor C11.

The sine wave generator 431 receives the triangle wave signal S4 output from the triangle wave converter 421, converts it into the sine wave signal INn, as shown in FIG. 5, and provides the sine wave signal INn to the differential amplification unit (211 of FIG. 2). The sine wave generator 431 includes an operational amplifier 435, resistors R21 and R22 and a capacitor C21.

Figure 6:
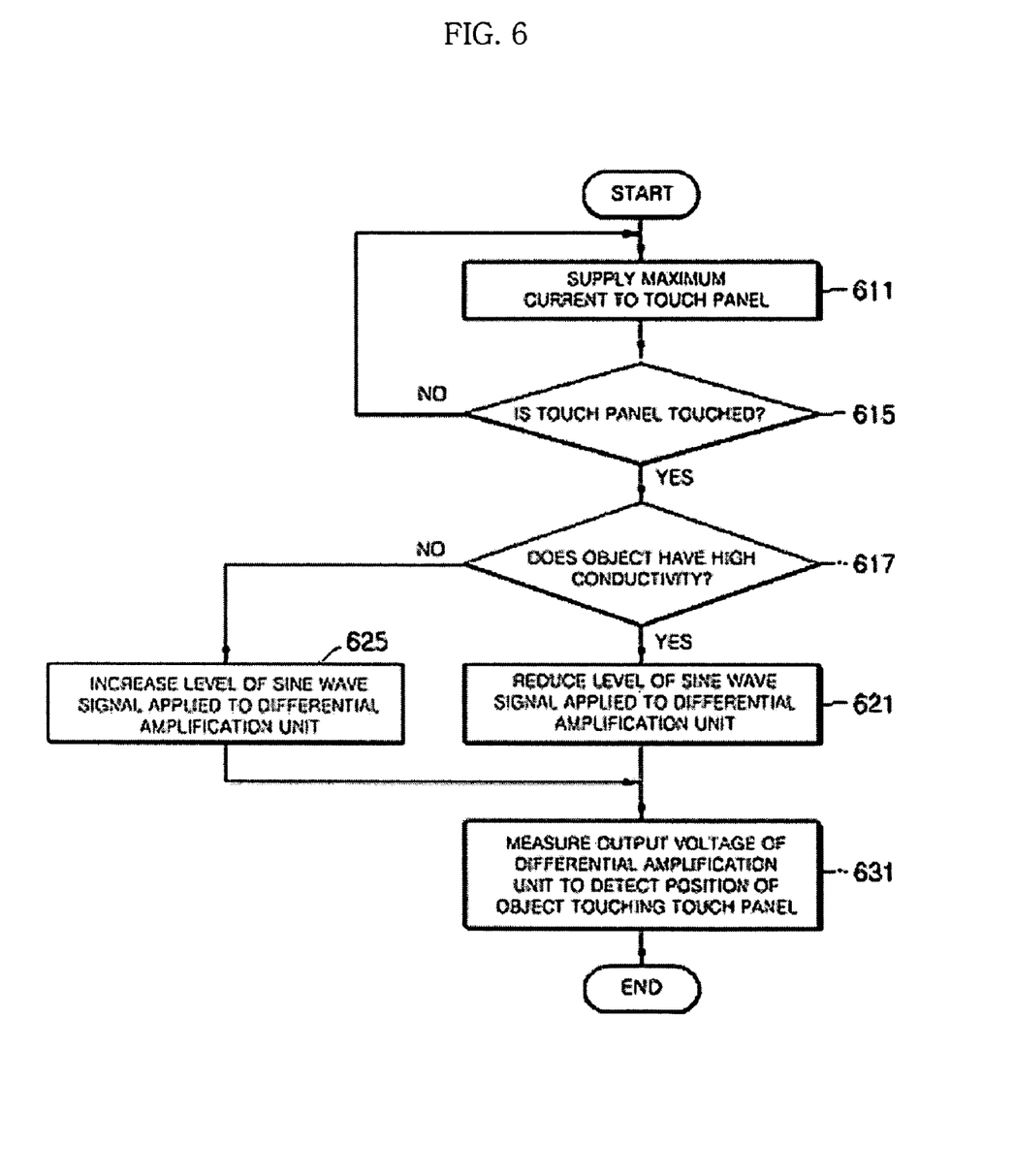
FIG. 6 is a flow chart showing a touch panel controlling method according to an embodiment of the present invention.

FIG. 6 is a flow chart showing a touch panel controlling method according to an embodiment of the present invention. The touch panel controlling method will now be explained with reference to FIGS. 1 and 2.

In the step 611, the control unit 251 applies the control signal S2 to the sine wave generating unit 261 such that the differential amplification unit 211 supplies the maximum current to the touch panel 101. Since the maximum current is applied to the touch panel 101, the quantity of current sufficient for detecting a touched point is output from the differential amplification unit 211 even if a user with very low conductivity touches the touch panel. Thus, the control unit 251 can recognize that an object touches the touch panel.

When the object touches the touch panel 101 in the step 615, the control unit 251 checks conductivity of the object in step 617. That is, the control unit 251 checks the quantity of current flowing from the differential amplification unit 211 to the touch panel 101.

When the quantity of current flowing from the differential amplification unit 211 to the touch panel 101 is large, the control unit 251 applies the control signal S2 to the sine wave generating unit 261 to reduce the level of the sine wave signal INn transmitted from the sine wave generating unit 261 to the differential amplification unit 211 in the step 621. Then, the level of the signal Pn output from the differential amplification unit 211 is decreased. When this process is repeated such that the output signal Pn of the differential amplification unit 211 reaches an appropriate level, the level of the sine wave signal INn supplied to the differential amplification unit 211 is fixed and the control unit 251 detects the position of the object touching the touch panel 101.

When the quantity of current flowing from the differential amplification unit 211 to the touch panel 101 is small, the control unit 251 increases the level of the sine wave signal INn transmitted from the sine wave generating unit 261 to the differential amplification unit 211 in the step 625.

When the object is removed from the touch panel 101, the quantity of current flowing from the differential amplification unit 221 to the touch panel 101 is reduced. Then, the control unit 251 senses the reduction in the quantity of current and increases the quantity of current supplied from the differential amplification unit 211 to the touch panel 101 to the maximum level.

In the step 631, the control unit 251 measures the output voltage Pn of the differential amplification unit 211 to detect the position of the object touching the touch panel 101.

As described above, the touch panel controlling device of the present invention supplies the maximum current to the touch panel when the touch panel is in the standby state, measures conductivity of a user when the user touches the touch panel, and reduces the level of the sine wave signal supplied from the sine wave generating unit to the differential amplification unit when the quantity of current flowing into the body of the user is large. When the quantity of current flowing into the body of the user is small, the touch panel controlling device of the present invention increases the level of the sine wave signal transmitted from the sine wave generating unit to the differential amplification unit. In this manner, the present invention controls the quantity of current supplied from the differential amplification unit to the touch panel to become an appropriate level in response to conductivity of the user touching the touch panel. This prevents unnecessary consumption of current and detects the correct touched point irrespective of conductivity of the user.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A device for controlling a touch panel comprising:
   a differential amplification unit for supplying current to a touch panel;
   a signal amplification unit for amplifying the output voltage of the differential amplification unit;
   an analog-digital conversion unit for converting the analog output signal of the signal amplification unit into a digital signal;
   a control unit for measuring the signal output from the analog-digital conversion unit and detecting the position of an object when the object touches the touch panel; and
   a sine wave generating unit for providing a sine wave signal to the differential amplification unit in response to an output signal of the control unit, supplying a maximum current to the differential amplification unit while the touch panel is in a standby state, and controlling the level of the sine wave signal in response to conductivity of the object when the object touches the touch panel.

2. The device as claimed in claim 1, further comprising a filtering unit for removing a noise included in the output signal of the signal amplification unit and transmitting the signal to the analog-digital conversion unit.

3. The device as claimed in claim 1, wherein, when the object touches the touch panel, the sine wave generating unit reduces the level of the sine wave signal provided to the differential amplification unit when the quantity of current supplied from the differential amplification unit to the touch panel is large but increases the level of the sine wave signal when the quantity of current is small.

4. The device as claimed in claim 1, wherein the sine wave generating unit comprises:
 a square wave controller for receiving a square wave signal from the control unit and controlling the level of the square wave signal;
 a triangle wave converter for converting the square wave signal output from the square wave controller into a triangle wave signal; and
 a sine wave generator for converting the triangle wave signal output from the triangle wave converter into a sine wave signal and supplying the sine wave signal to the differential amplification unit.

5. The device as claimed in claim 4, wherein the square wave controller includes a potentiometer for controlling the level of the square wave signal in response to a control signal output from the control unit and transmitting the square wave signal to the triangle wave converter.

* * * * *